US005568381A

United States Patent [19]
Hara et al.

[11] Patent Number: 5,568,381
[45] Date of Patent: Oct. 22, 1996

[54] COMBINATORIAL OPTIMIZATION SYSTEM THAT EXTRACTS AN UNDERSIRABLE RELATIONSHIP FROM A PRESENT SOLUTION

[75] Inventors: Hirotaka Hara; Nobuhiro Yugami; Kazuhiro Ohishi, all of Kawasaki, Japan

[73] Assignee: Fujitsu Limited, Japan

[21] Appl. No.: 311,040

[22] Filed: Sep. 26, 1994

Related U.S. Application Data

[63] Continuation of Ser. No. 884,403, May 18, 1992, abandoned.

[30] Foreign Application Priority Data

May 18, 1991 [JP] Japan .................. 3-113579

[51] Int. Cl.$^6$ .............. G06F 17/00; G06F 17/60
[52] U.S. Cl. ............... 364/402; 364/401 R; 364/468.18
[58] Field of Search .................. 364/400, 401, 364/402, 468, 478, 148

[56] References Cited

U.S. PATENT DOCUMENTS

| | | | |
|---|---|---|---|
| 4,858,147 | 8/1989 | Conwell | 364/513 |
| 5,148,370 | 9/1992 | Litt et al. | 364/468 |
| 5,195,026 | 3/1993 | Nonaka et al. | 364/148 |
| 5,195,172 | 3/1993 | Elad et al. | 395/50 |
| 5,216,593 | 6/1993 | Dietrich et al. | 364/402 |
| 5,222,192 | 6/1993 | Shaefer | 395/13 |
| 5,237,514 | 8/1993 | Curtin | 364/490 |
| 5,241,465 | 8/1993 | Oba et al. | 364/401 |
| 5,276,607 | 1/1994 | Harris et al. | 364/401 |
| 5,291,391 | 3/1994 | Mead et al. | 364/148 |
| 5,295,231 | 3/1994 | Ogino | 395/77 |
| 5,303,144 | 4/1994 | Kawashima et al. | 364/401 |
| 5,369,570 | 11/1994 | Parad | 364/401 |

OTHER PUBLICATIONS

Combination Optimizing Device –Ryuich Mato, et al. (Patent Abstracts of Japan) Filed Oct. 19, 1990 (Appl.#02–282081).

*Primary Examiner*—Robert A. Weinhardt
*Assistant Examiner*—Joseph Thomas
*Attorney, Agent, or Firm*—Staas & Halsey

[57] ABSTRACT

A combinatorial optimization system to reduce the number of neighborhoods generated by modifying a part of the present solution so that one improvement can be performed in a short time, and to efficiently obtain an optimum solution without resulting in a local optimum solution. The system comprises a device for extracting from the present solution a relationship including a possible improvement in an objective function, a device for cumulatively storing all the extracted inclusive relationships, a device for generating a neighborhood of the present solution after modifying the inclusive relationship extracted from the present solution, a checking device for determining a neighborhood as a new solution when the generated neighborhood does not include the inclusive relationship stored in the inclusive relationship accumulative storage, and a controller for providing for the inclusive relationship extractor the new solution outputted by a checker until the searching conditions are satisfied to reach an optimum solution.

6 Claims, 11 Drawing Sheets

ASSIGNMENT OF MACHINE

| JOB \ PROCESS | 1 | 2 | 3 |
|---|---|---|---|
| 1 | 1 | 2 | 3 |
| 2 | 3 | 1 | 2 |
| 3 | 1 | 3 | 2 |
| 4 | 2 | 3 | 1 |

PROCESS TIME

| JOB \ PROCESS | 1 | 2 | 3 |
|---|---|---|---|
| 1 | 5 | 8 | 2 |
| 2 | 7 | 3 | 9 |
| 3 | 1 | 7 | 10 |
| 4 | 4 | 11 | 7 |

| MACHINE | JOB |
|---|---|
| 1 | 1 - 3 - 2 - 4 |
| 2 | 4 - 1 - 2 - 3 |
| 3 | 2 - 1 - 4 - 3 |

| MACHINE | JOB |
|---------|-----|
| 1 | 1 - 3 - 2 - 4 |
| 2 | 4 - 1 - 2 - 3 |
| 3 | 2 - 1 - 3 - 4 |

| VALUE OF OBJECTIVE FUNCTION | 137 | 135 | 133 | 132 | 124 |
|---|---|---|---|---|---|
| BRANCH AND BOUND METHOD | 47 | 123 | 318 | X | X |
| MOUNTAIN-CLIMBING METHOD | 18 | X | X | X | X |
| PRESENT INVENTION | 18 | 30 | 54 | 103 | 3191 |

Fig. 11

COMBINATORIAL OPTIMIZATION SYSTEM THAT EXTRACTS AN UNDERSIRABLE RELATIONSHIP FROM A PRESENT SOLUTION

This application is a continuation of application Ser. No. 07/884,403, filed May 18, 1992, now abandoned.

BACKGROUND OF THE INVENTION

1. Field of the Invention

The present invention relates to a system applicable to production, administration, management, etc., and more specifically to a combinatorial optimization system for optimizing an objective function in the combination of a plurality of elements.

2. Description of the Related Art

Conventional systems process various combinatorial optimization problems, such as scheduling problems. An example of a scheduling problem is a job shop problem.

FIG. 1 is a block diagram for explaining the 4-jobs-3-machines job shop problem. A job shop problem is a problem of effectively deciding job operational order on each machine when job operations are already assigned to corresponding machines. In FIG. 1A, 1 through 4 are four kinds of jobs each comprising three operations 1 through 3. Each operation in each job is assigned to a specific machine. For example, in job 2, operation 1 is assigned to machine 3, operation 2 is assigned to machine 1, and operation 3 is assigned to machine 2. In connection with this, processing time required for executing each operation of each job is also determined. For example, the processing time for operation 1 of job 2 is 7, that for operation 2 is 3, and that for operation 3 is 9.

In a job shop problem, if the sequence of job operations performed by each machine is determined, operations performed in each machine, that is, a schedule, is uniquely determined. FIG. 1B shows an example of a schedule for performing operations belonging to job 1, 4, 2, and 3 in this order in each machine. In FIG. 1B, the order of operations in each machine is represented by three digits. For example, "431" means that this operation is the 3rd operation of job 4 and is performed on machine 1.

In FIG. 1B, the last-terminated operations process "332" ends at time "57". This last-termination time is used as an objective function in a job shop problem. A combinatorial optimization problem is given to minimize the value of this function, that is, the termination time of the last operations. To solve the problem is to determine a sequence of the operations on each machine. In FIG. 1B, in order to terminate the last operation "332" on machine 2, earlier than the present value 57, a termination time of the previous operation "232" on machine 2 must be terminated earlier than present value 47. To do this, the termination time of operation "221" must be shortened. To terminate operation 221 earlier than the present termination time, the previous operation "431" by machine 1 and operation "213" on machine 3 must be terminated earlier. (The rest is performed likewise.) It is obvious that operation "332" cannot be terminated earlier although operation "323" is terminated earlier by machine 3 unless operation "232" is terminated earlier.

FIG. 2 indicates that a value of objective function in a job shop problem depends only on a schedule, which is called a critical path (indicated by bold lines). That is, it indicates that an objective function is locally recognized and processed in a job shop problem. By contrast, in a communication network design problem, for example, the value of an objective function varies when the number of lines changes if the objective function is defined as the sum of the cost of all the communication lines. In this case, the objective function is considered global.

Regardless of a local objective function or a global objective function, combinatorial optimization problems such as job shop problems are referred to as NP complete problems. The NP complete problems are explained below.

For example, in a traveling salesman problem, the general input for the problem contains the number of cities as the problem size and the distances of the cities from one another. The size of the input data is referred to as an input size. Q(In) indicates that a problem Q is provided with the input In of the size n. When an algorithm A is given to solve the problem Q, the necessary number of basic operations to solve Q(In) is represented as $f_Q^A(In)$, and the maximum value of $f_Q^A(In)$ for all the applicable data In is represented as $F_Q^A(In)$. If $F_Q^A(In)$ is represented by a polynomial of n, A is referred to as an algorithm having a good order in its polynomial, and the problem Q having this algorithm is regarded as belonging to class P. It is very difficult to show that the problem Q does not belong to class P. However, a problem which can be considered probably not to belong to class P is referred to as having NP complete. It is clear that many problems belong to this class.

It is hard to solve the problems having the NP integrity, and an efficient approximate algorithm is thus required.

Usually, in a conventional approximate algorithm, a neighbor solution (called "initial solution") obtained somehow is compared with its neighborhood, that is, another solution obtained by modifying the initial solution. If a view of objective function is better than that of initial solution, it replaces the initial solution. This is a well-known method referred to as the "iterative improvement method" (or "hill-climbing method"). Recently suggested was a simulated annealing method which permits modification toward a solution of probably worse evaluation.

Next, the conventional iterative improvement method is explained briefly by referring to FIG. 3.

In FIG. 3 (Prior Art), a solution storing module 1 stores a present solution.

A local searching module 2 generates a neighbor solution by modifying a present solution stored in the solution storing module 1, and then stores the neighbor solution in a neighborhood storing module 3.

The neighborhood storing module 3 stores a neighbor solution.

A modification checking module 4 checks based on an objective function whether or not a neighbor solution generated and stored in the neighborhood storing module 3 is actually an improvement on the present solution. If yes, the new solution replaces the present solution and is stored in the solution storing module 1.

Next, the operation of the conventional iterative improvement method is explained briefly. (1) A solution (initial solution) generated somehow is stored in the solution storing module 1. (2) The local searching module 2 generating a neighbor solution by modifying the present solution stored in the solution storing module 1, and the resultant neighbor solution is stored in the neighborhood storing module 3. (3) The modification checking module 4 compares a newly generated neighbor solution stored in the neighborhood storing module 3 with the solution stored in the solution storing module 1, and then checks by referring to an objective function whether or not the new solution is an improvement. If yes, the solution stored in the solution storing module 1 is replaced with the new solution. (4) If not, the processes (2) and (3) are repeated to obtain an improved solution.

However, when the size of a problem becomes larger in such a conventional method as the above described iterative improvement method, the number of neighbor solutions, which are generated by modifying the present solution, increases greatly, so the time taken for one improvement is prolonged, and the total efficiency deteriorates. Besides, since a solution is rewritten only when an objective function is improved, further improvement cannot be made even though it is not a global optimum solution but a local optimum solution, thereby often resulting in an unsatisfactory solution.

SUMMARY OF THE INVENTION

An object of the present invention is to shorten the necessary time required for one improvement by reducing the number of neighborhoods and to obtain a global optimum solution without resulting in a local optimum solution.

The present invention processes various combinatorial optimization problems such as knapsack problems (fund planning problems), transportation problems (factory location problems), traveling salesman problems (scheduling problems), etc. A job shop problem is an example of a scheduling problem. The present invention is a combinatorial optimization system for optimizing the combination of a plurality of elements. The system includes possible improvement inclusive relationship extracting means for extracting a possible improvement inclusive relationship from a present solution of a combination based on an objective function for said optimization a relationship between combinatorial elements and a relationship having no possible improvement of said objective function without modifying said relationship. The system also includes possible improvement inclusive relationship accumulative storing means for accumulating the inclusive relationship extracted by said possible improvement inclusive relationship extracting means. The system further includes local searching means for modifying the possible improvement inclusive relationship in the present solution and for generating another solution as a neighborhood of the present solution. The system further includes generated solution checking means for checking whether or not said solution generated by said local searching means contains the inclusive relationship accumulated in said possible improvement inclusive relationship accumulative storing means, and for substituting said generated solution as a new solution when said check determines no. The system also includes controlling means for searching out an optimum solution by providing a new solution substituted by said generated solution checking means for said possible improvement inclusive relationship extracting means until conditions for terminating a search for an optimum solution are satisfied.

BRIEF DESCRIPTION OF THE DRAWINGS

FIG. 11 is a table indicating the effect of the present invention in the 20-jobs-10-machines job shop problem.

DESCRIPTION OF THE PREFERRED EMBODIMENT

Figure 4:
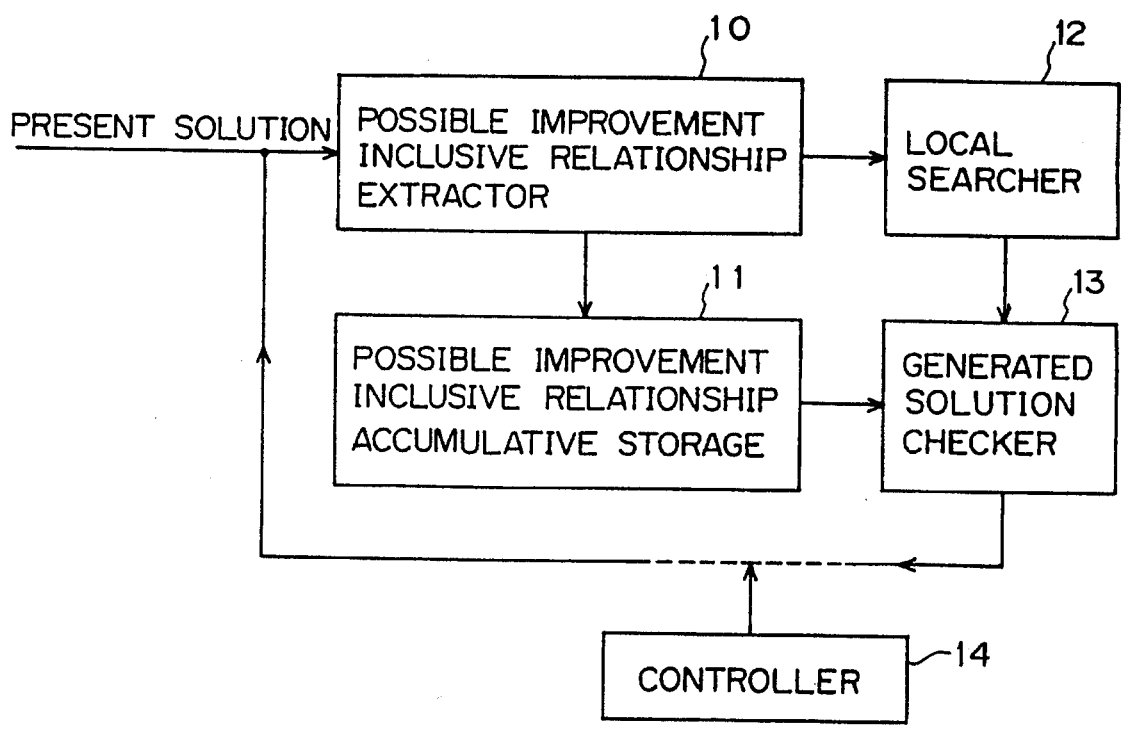
FIG. 4 is a block diagram for explaining the principle of the present invention.

FIG. 4 is a block diagram for explaining the principle of the present invention, and for explaining a combinatorial optimization system for optimizing the combination of a plurality of elements. In FIG. 4, a possible improvement inclusive relationship extractor 10 is, for example, an NG relationship extracting module, for extracting a relationship between elements of a combination that the present solution cannot be improved without altering this relationship. The relationship is extracted as a possible improvement inclusive relationship, for example, an NG (i.e., "No-Good") relationship. An NG relationship means a subset of possible solutions which will not lead to an optimum solution.

The possible improvement inclusive relationship is one which does not always improve an objective function, but at least it must be changed for improving. Therefore, it is an undesirable, or "No-Good" relationship and is referred to as an NG relationship.

A possible improvement inclusive relationship accumulative storage 11 is, for example, an NG relationship accumulating module for accumulatively storing the inclusive relationship, that is, the NG relationship, extracted by the possible improvement inclusive relationship extractor 10. A local searcher 12 is, for example, a local searching module for modifying the present solution's possible improvement inclusive relationship, that is, the NG relationship, to generate another solution as a neighborhood of the present solution.

A generated solution checker 13 is, for example, a modification checking module including an NG checker. The generated solution checker 13 checks whether or not the solution generated by the local searcher 12 includes the inclusive relationship, which is an NG relationship accumulated in the possible improvement inclusive relationship accumulative storage 11. If not, the generated solution replaces the present solution with a new solution. A controller 14 continues searching for an optimum solution by repeating the process described above by inputting the new solution into extractor 10, until the termination condition of an optimum solution search is satisfied.

In the present invention, a possible improvement inclusive relationship is extracted from the present solution, and neighborhoods of the present solution are generated by modifying the relationship. If the generated neighborhood includes no possible improvement inclusive relationships accumulated previously, it becomes a new solution. That is, in FIG. 4, the possible improvement inclusive relationship extractor 10 extracts a possible improvement inclusive relationship, an NG relationship, from the initial solution generated somehow. The extracted relationship is stored in the possible improvement inclusive relationship accumulative storage 11 and is applied to the local searcher 12. The extracted NG relationship corresponds to, for example, the relationship between elements in the critical path described in FIGS. 1 and 2, that is, the relationship between operations "232" and "332" for machine 2 shown in FIG. 1B, for example.

Next, the local searcher 12 modifies the present solution by breaking the possible improvement inclusive relationship extracted from the initial solution and generate a neighborhood of the initial solution. For example, the modification of the inclusive relationship corresponding to the operations "232" and "332" in FIG. 1B, will be done by altering an order of operations "232" and "332" as an increase order on machine 2. (However, the modification does not improve an objective function.) The generated neighborhood is checked whether or not the neighborhood contains a previously accumulated NG relationship. If not, the neighborhood becomes a new solution, and the processes following the extraction of the possible improvement inclusive relationship for the new solution are repeated until a termination condition of an optimum solution search is satisfied. If the possible improvement inclusive relationship extractor 10 extracts a plurality of inclusive relationships from the present solution, one inclusive relationship is selected according to a predetermined selective criterion. Then, a neighborhood of the present solution is generated by modifying the selected inclusive relationship.

As described above, even if a plurality of possible improvement inclusive relationships are extracted in the present invention, the time taken for one improvement can be shortened by selecting one of them according to a predetermined selective criterion. When a generated neighborhood contains the possible improvement inclusive relationship accumulated previously, the modification checking module rejects this neighborhood and the local searching module makes a new neighborhood until it finds a neighborhood that does not contain any improvement inclusive relationship.

Figure 5:
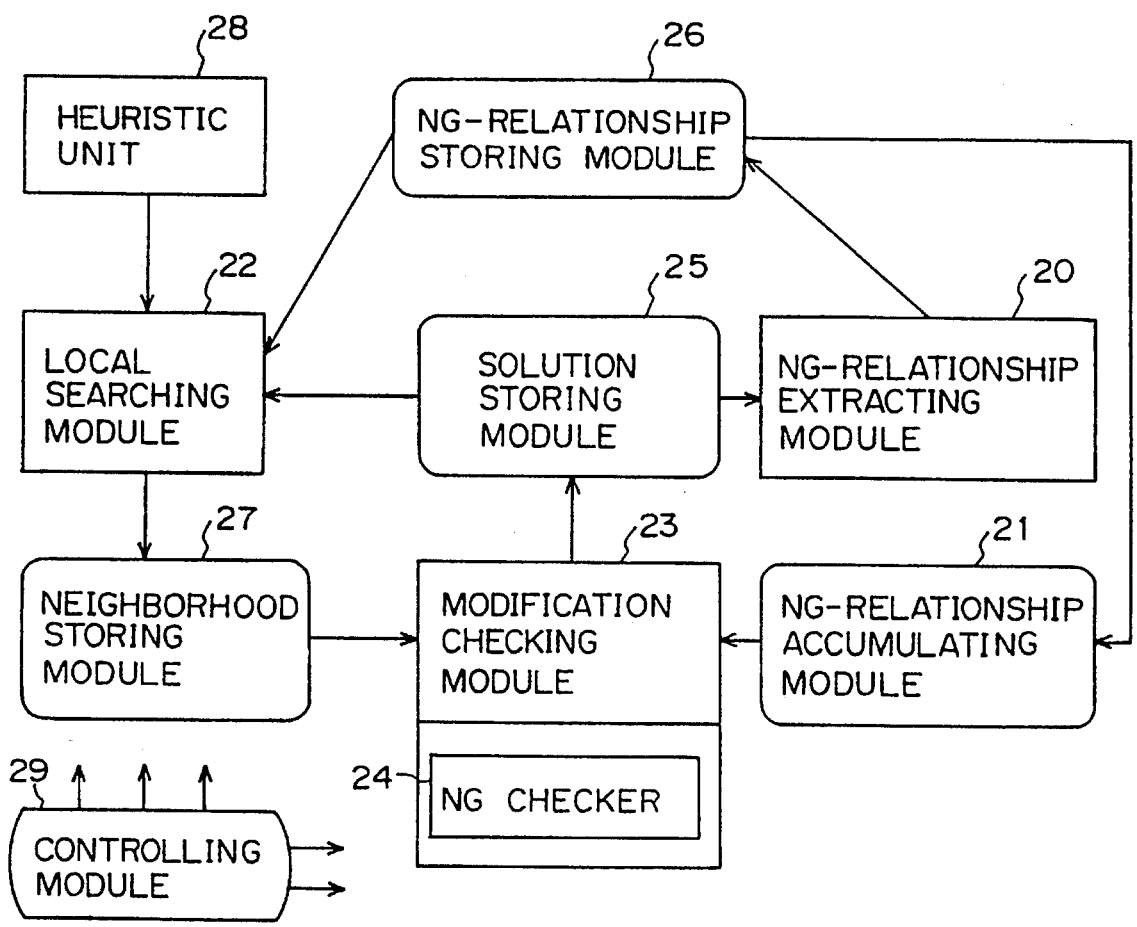
FIG. 5 is a block diagram for explaining the system configuration operated in the combinatorial optimization system of the present invention.

FIG. 5 is a block diagram for explaining the construction of the system operated by the combinatorial optimization method. In FIG. 5, an NG relationship extracting module 20 corresponds to the possible improvement inclusive relationship extractor 10 shown in FIG. 4, and extracts a possible improvement inclusive relationship, an NG relationship, from the present solution stored in a solution storing module 25. The extracted NG relationship is stored in an NG relationship storing module 26 and simultaneously stored additionally in an NG relationship accumulating module 21 corresponding to the possible improvement inclusive relationship accumulative storage 11.

A local searching module 22 corresponds to the local searcher 12, and modifies the NG relationship of the present solution stored in the NG relationship storing module 26 to generate a neighborhood of the present solution. The generated neighborhood is stored in a neighborhood storing module 27. A modification checking module 23 containing an NG checker 24 corresponds to the generated solution checker 13. The NG checker 24, a part of the generated solution checking module 23, determines whether or not the neighborhood stored in the neighborhood storing module 27 contains the previous NG relationship stored in the NG relationship accumulating module 21. If not, the modification checking module 23 treats the neighborhood as a new solution to replace the present solution stored in the solution storing module 25.

A heuristic unit 28 provides to the local searching module 22 a selective criterion for selecting an appropriate NG relationship to perform a local search when there are a plurality of NG relationships extracted for the present solution. For example, in the job shop problem discussed above, the heuristic unit 28 stores a selective criterion which selects an NG relationship appearing later in time among a plurality of NG relationships. The operation of each part shown in FIG. 5 is controlled by a controlling module 29.

Figure 6:
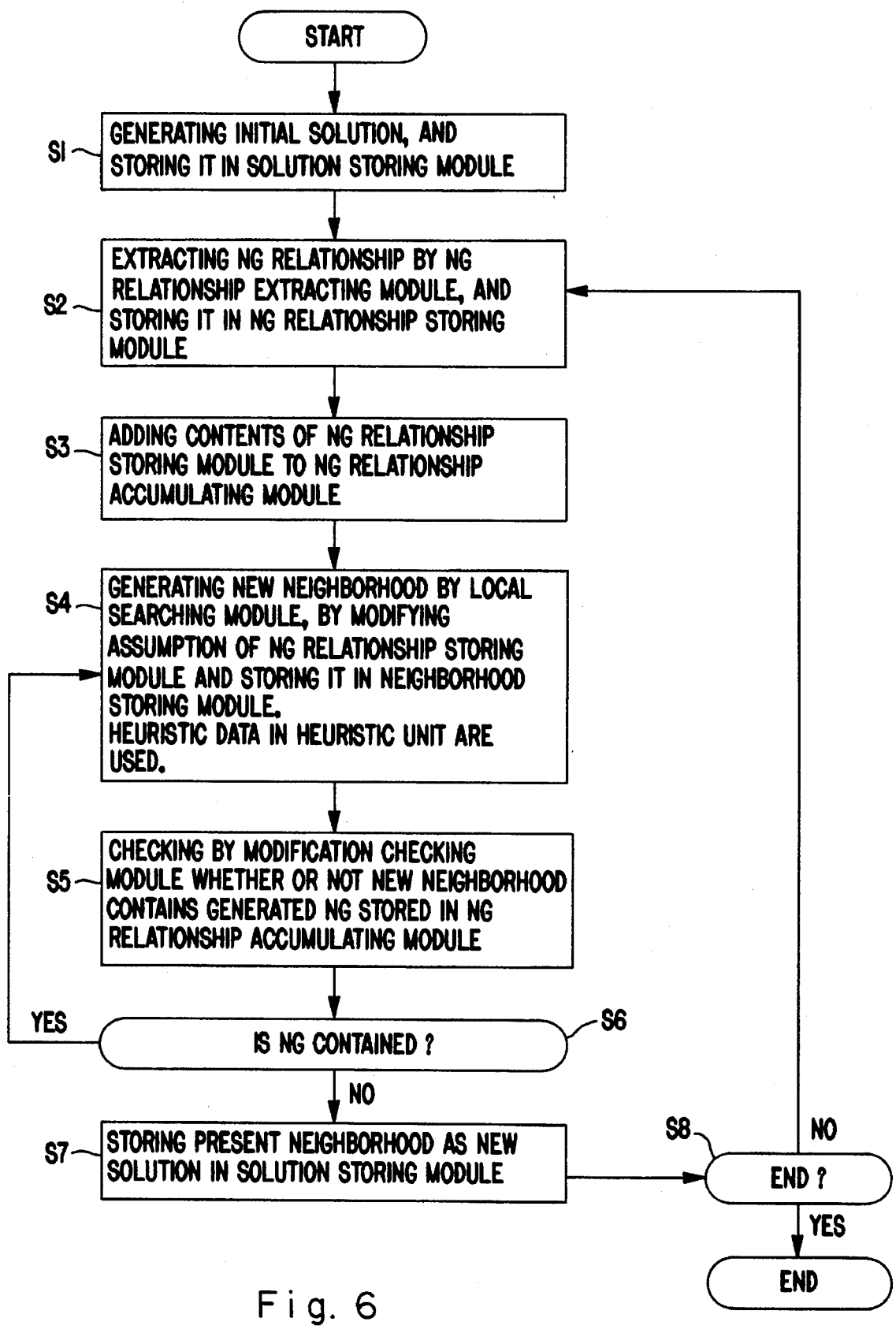
FIG. 6 is a flowchart of the processes of an embodiment of the present invention.

FIG. 6 is a flowchart of the operation of the embodiment operated in the combination optimization system of the present invention. In FIG. 6, when the operation is started, an initial solution is generated in step (S) 1 and stored in the solution storing module 25. In S2, an NG relationship is extracted by the NG relationship extracting module 20 and is stored in the NG relationship storing module 26. Then, in S3, it is additionally stored in the NG relationship accumulating module 21.

In S4, the local searching module 22 generates a new neighborhood by modifying an NG relationship stored in the NG relationship storing module 26. The neighborhood is stored in the neighborhood storing module 27. Heuristic data stored in the heuristic unit 28 are used in generating a neighborhood. In S5, the modification checking module 23 checks whether or not the new neighborhood contains the NG relationship stored in the NG relationship accumulating module 21. The result is determined in S6. If yes, the processes in and following step S4 are performed repeatedly.

If it is determined in S6 that no NG relationships already generated are contained, the present neighborhood is stored as a new solution in the solution storing module 25 in S7. Then, in S8, determination is made as to whether or not termination conditions such as the searching time or the number of searches are satisfied. If not, the processes in and following step S2 are performed repeatedly until the conditions are determined to be satisfied.

Figure 7:
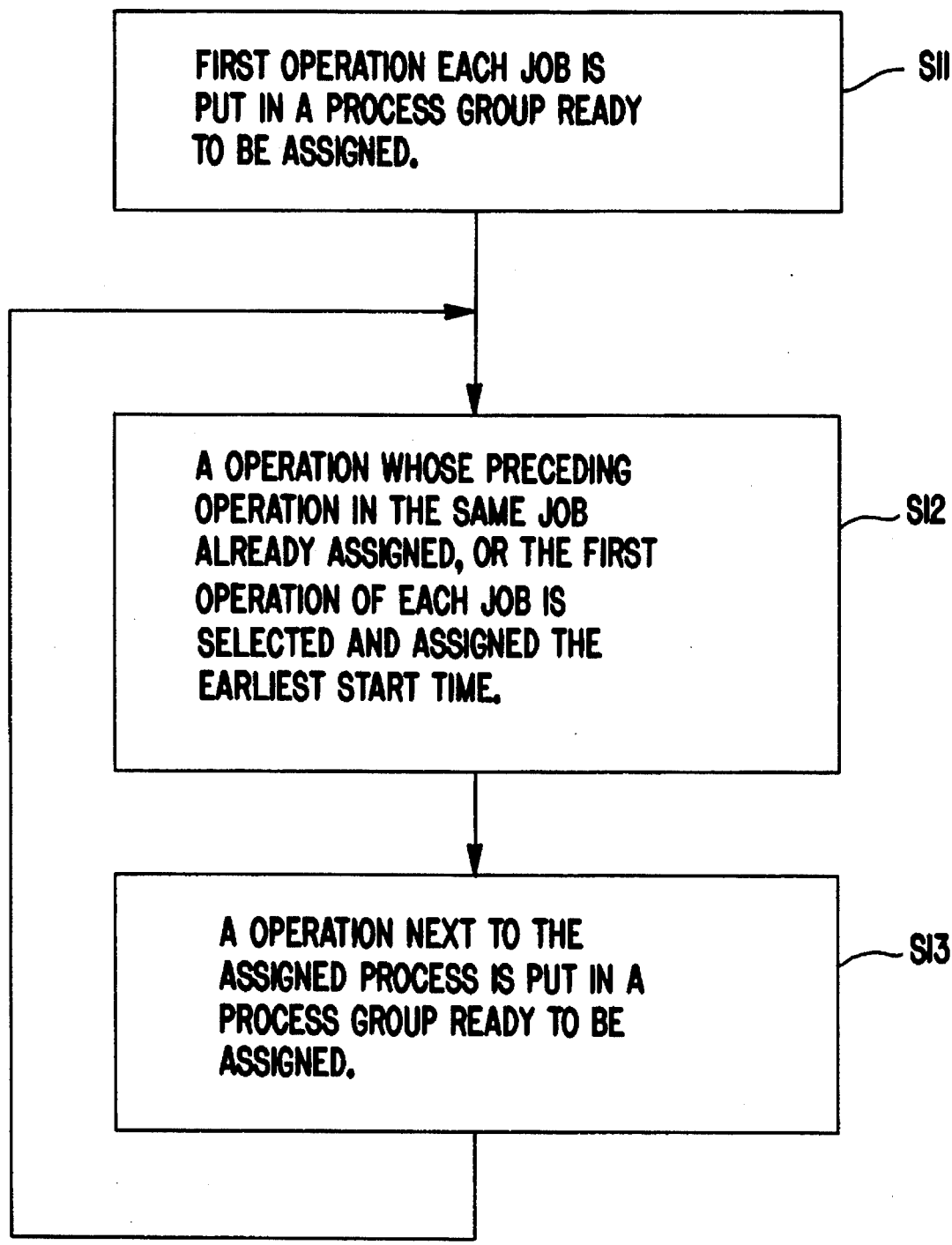
FIG. 7 is a detailed flowchart of an initial solution generating process in a job shop problem.

FIG. 7 is a detailed flowchart of a process of generating an initial solution in S1 shown in FIG. 6 relating to the above described job shop problem. In S11 shown in FIG. 7, the first operation of each job is put in an operation group ready to be assigned. In S12, an operation is selected from the process group ready to be assigned. The selected process is assigned the earliest start time of each machine. In S13, the operation next to the assigned operation is put in the operation group ready to be assigned if the assigned one is not a last one of the job, and the processes in and following S12 are performed repeatedly.

Figure 8:
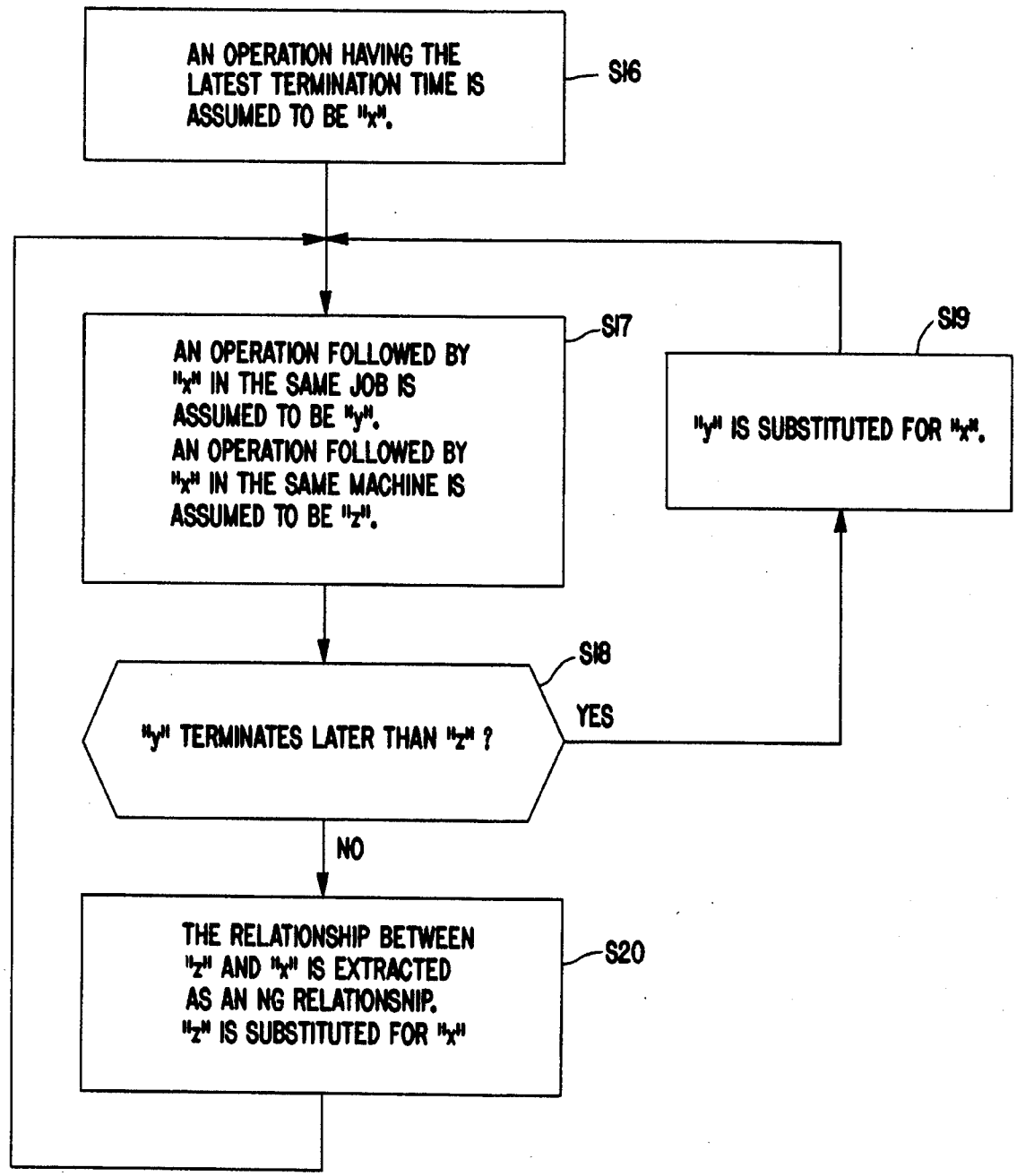
FIG. 8 is a detailed flowchart of an NG relationship extracting process in a job shop problem.

FIG. 8 is a detailed flowchart of a process of extracting NG relationships in S2 shown in FIG. 6 relating to the job shop problem. In S16 shown in FIG. 8, an operation having the latest termination time among all operations is assumed to be "x". In S17, an operation followed by x in the same job is assumed to be "y", and an operation followed by x in the same machine is assumed to be "z".

In S18, determination is made as to whether the termination time of "y" is later than that of "z". If yes, "y" is substituted for "x" in S19 and the processes in and following S17 are performed repeatedly. If not, the relationship between "z" and "x" is extracted as an element NG relationship, "z" is substituted for "x", and the processes in and following S17 are performed repeatedly in S20.

Figures 1A, 1B:
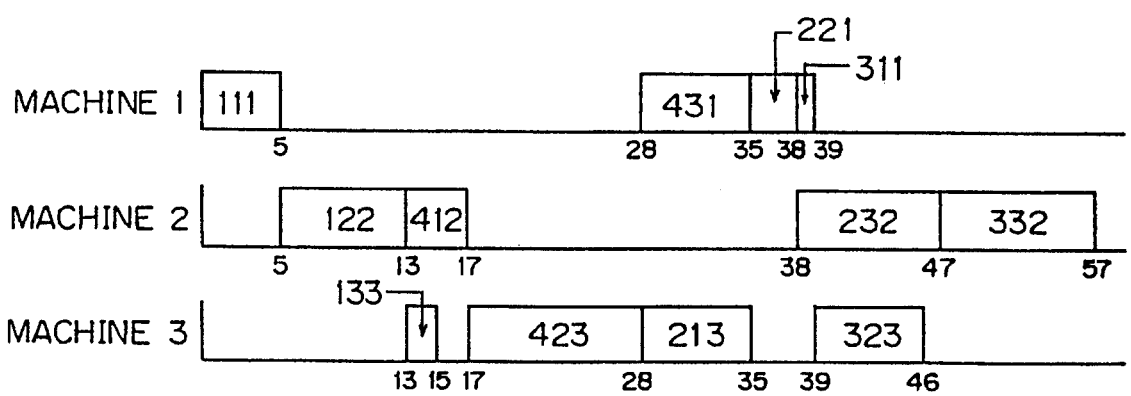
FIGS. 1A and 1B are tabulations for explaining a job shop problem as a combinatorial optimization problem.
Figure 2:
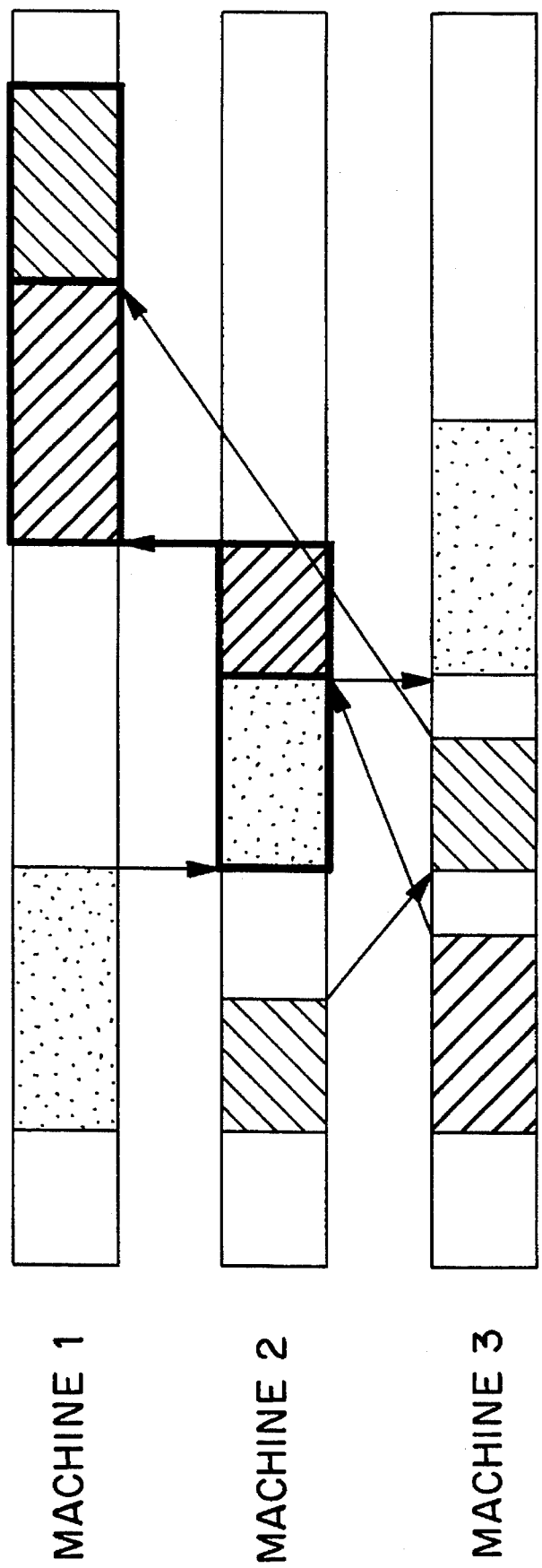
FIG. 2 is a view for explaining a critical path in a job shop problem.
Figure 3:
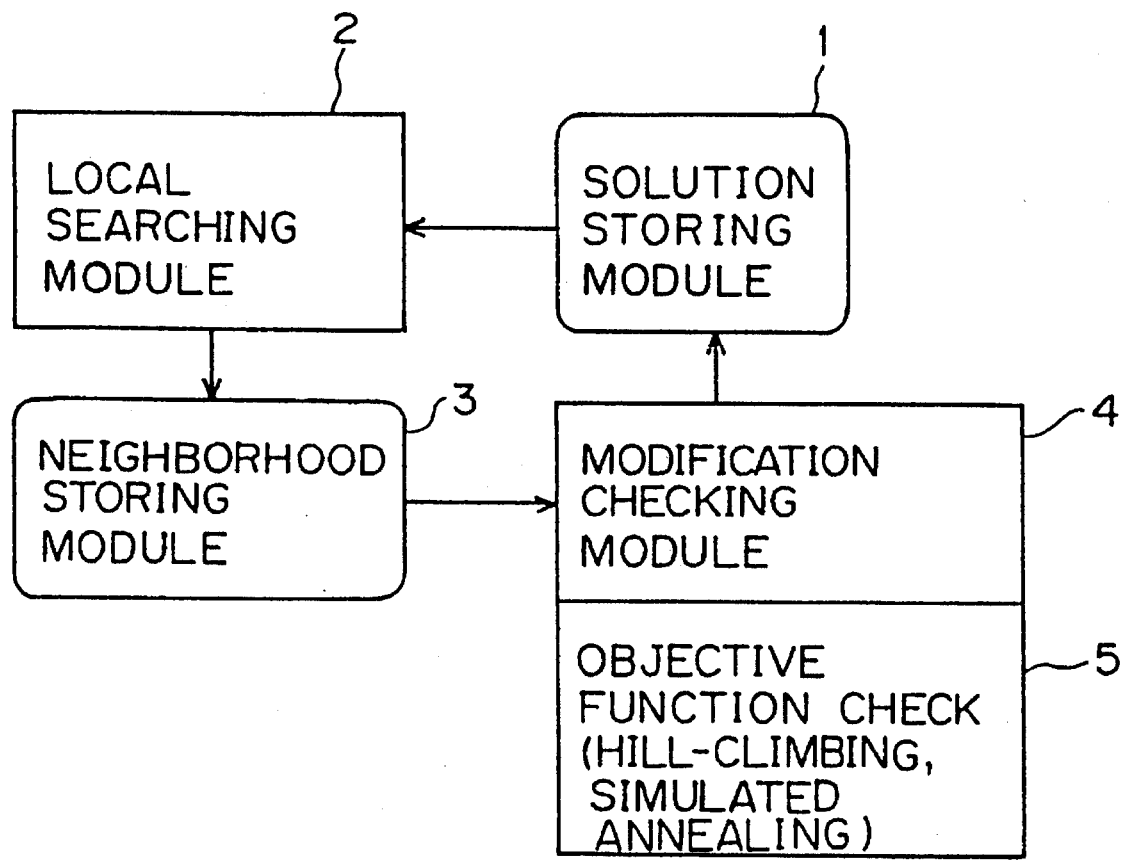
FIG. 3 (Prior Art) illustrates an iterative improvement method of the prior art technology.
Figures 9A, 9B:
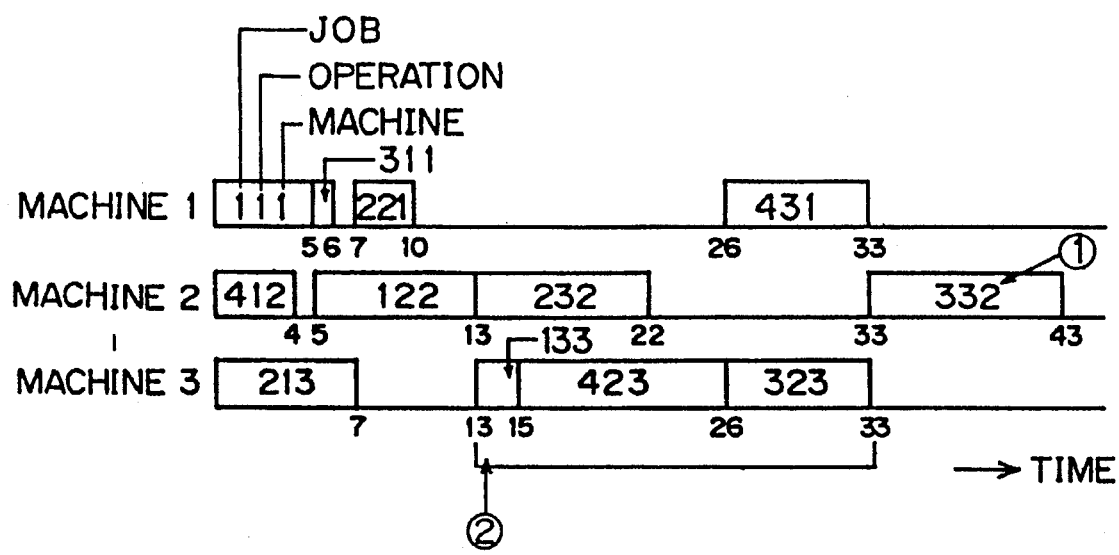
FIGS. 9A and 9B are diagrams (1) for explaining a schedule improvement sample in the job shop problem shown in FIG. 1.
Figures 10A, 10B:
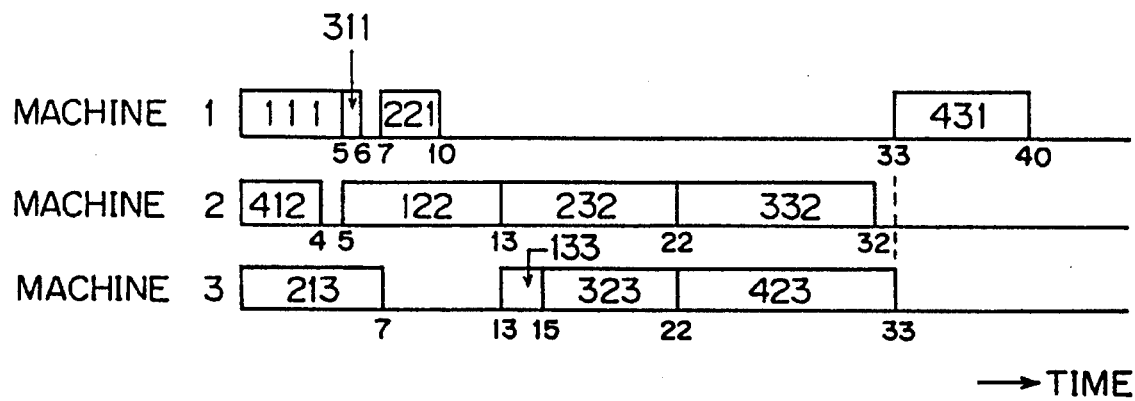
FIGS. 10A and 10B are a diagrams (2) for explaining a schedule improvement sample in the job shop problem shown in FIG. 1.

FIGS. 9 and 10 show examples of improving a schedule using the combinatorial optimization system of the present invention for the 4-jobs-3-machines job shop problem shown in FIG. 1. FIG. 9 shows a schedule as a result of a search for an optimum solution which is performed on the schedule shown in FIG. 1B as the initial solution. FIG. 10 shows an improvement of the schedule shown in FIG. 9.

As described above, in a job shop problem, a schedule is uniquely determined according to the operation sequence for each machine. In FIG. 9A, machine 1 performs processes 1, 3, 2, and 4 in that order; machine 2 performs processes 4, 1, 2, and 3 in that order; and machine 3 performs processes 2, 1, 4, and 3 in that order. As a result, the termination time of all the operations as an objective function is "43", thereby resulting in a remarkable improvement in comparison with "57" in FIG. 1.

Each of ① and ② in FIG. 9B shows a part of the above described critical path. In the relationships among the elements of the critical path, the relationship between operation "423" and operation "323" for machine 3, or the relationship between operation "133" and operation "423" for machine 3 are referred to as an NG relationship.

In FIG. 8, an initial "x" in S16 corresponds to operation "332"; "y" operations to operation "323"; and "z" corresponds to operation "232". In this case, "y" terminates later than "z". In S19, "x" indicates operation "323". In S17, a new "y" indicates "311" and new "z" indicates "423" . Therefore, "y" terminates earlier than "z", the relationship between "423" and "323" is assumed to be an NG relationship, "x" indicates "423", and the processes in and following S17 are continued.

As described above, according to the selective criterion stored in the heuristic unit, the order of processes "423" and "323" for machine 3, which are the NG relationships for the latest timing, is changed.

FIG. 10 shows the schedule after the change of the operation order. In FIG. 10, the operation order in the job for machine 3 is 2, 1, 3, and 4 sequentially. When the NG relationship is thus modified, the operations for each machine are reassigned starting at time 0. As a result, the schedule shown in FIG. 10 can be obtained by delaying operation "431" for machine 1 and hastening operation "332" for machine 2. The termination time of the last operation becomes "40", an improvement of the value shown in FIG. 9.

FIG. 11 is a table indicating the effect of the present invention relating to the 20-jobs-10-machines job shop problem. In FIG. 11, the time taken for obtaining a solution by the conventional "branch and bound method" and "hill-climbing method" is compared with that by the present invention. "X" indicates that no solutions can be obtained by a two-hour search. In the conventional branch and bound method, an objective function "133" is obtained in 318 seconds, while in the present invention, an objective function "132" is obtained in 103 seconds. Furthermore, in the present invention, an objective function "124" is obtained in 3191 seconds, a little longer time.

The present invention is achieved by a computer system including a CPU, RAM, ROM and Bus. The algorithm described above is performed by the CPU in accordance with the program shown in the flowcharts of FIGS. 6, 7 and 8 and stored in the ROM, for example. The data to be processed according to the present invention is stored in the RAM, for example.

As described above, the present invention performs one improvement in a short time and obtains an optimum solution without resulting in a local optimum solution. Therefore, the present invention can be utilized in production, administration, and management in all fields of industry where a combinatorial optimization problem must be solved.

What is claimed is:

1. A computerized combinatorial optimization apparatus for optimizing a combination of a plurality of operations for at least one machine in a present solution, comprising:

undesirable relationship extracting digital processing means for extracting an undesirable relationship between said combination of operations in said present solution based on an objective function for said optimization, said objective function having no possible improvement without modifying said undesirable relationship, undesirable relationship accumulative storing digital processing means for cumulatively storing said undesirable relationship extracted by said undesirable relationship extracting means, local searching digital processing means for modifying said undesirable relationship in the present solution and for generating another solution as a neighborhood of the present solution based on the modified undesirable relationship, generated solution checking digital processing means for checking whether or not said another solution generated by said local searching means includes the undesirable relationship cumulatively stored in said undesirable relationship accumulative storing means, and for substituting said another solution for said present solution as a new solution when a result of a check by said generated solution checking means is that said another solution does not include the undesirable relationship stored in said undesirable relationship accumulative storing means, controlling digital processing means for searching for an optimum solution by providing said new solution substituted by said generated solution checking means to said undesirable relationship extracting means and repeating the functions performed by said undesirable relationship extracting digital processing means, said undesirable relationship accumulative storing digital processing means, said local searching digital processing means, and said generated solution checking digital processing means until conditions for terminating a search for an optimum solution are satisfied; and optimizing means for using said optimum solution to optimize said combination of said plurality of operations for said at least one machine.

2. A computerized combinatorial optimization apparatus according to claim 1, wherein said undesirable relationship extracting digital processing means comprises an undesirable relationship extracting module for extracting said undesirable relationship, said undesirable relationship accumulative storing digital processing means comprises an undesirable relationship accumulating module for cumulatively storing said undesirable relationship, said local searching digital processing means comprises a local searching module for generating said another solution as a neighborhood, said generated solution checking digital processing means comprises a modification checking module including an undesirable checker for checking whether or not a solution generated by said local searching module using the contents stored in said undesirable relationship accumulating module includes said accumulated undesirable relationship, and said apparatus further comprises:

a solution storing digital processing module for storing a solution from which said undesirable relationship is extracted by said undesirable relationship extracting module, undesirable relationship storing digital processing module for storing said extracted undesirable relationship, and a neighborhood storing digital processing module for storing said another solution as a neighborhood generated by said local searching module.

3. A computerized combinatorial optimization apparatus according to claim 2, further comprising:

a heuristic digital processing unit for storing a predetermined selection criterion upon which said local searching module selects one of a plurality of said undesirable relationships to be modified when a plurality of said undesirable relationships are extracted by said undesirable relationship extracting module.

4. A computerized combinatorial optimization apparatus according to claim 3, wherein said solution storing digital processing module stores an initial solution, said undesirable relationship extracting module extracts said undesirable relationship from said initial solution stored in said solution storing digital processing module and stores said extracted undesirable relationship in said undesirable relationship storing digital processing module, said undesirable relationship accumulating module accumulates and stores said extracted undesirable relationship, said local searching module modifies an undesirable relationship stored in said undesirable relationship storing digital processing module using said predetermined selection criterion stored in said heuristic digital processing unit to generate a new neighborhood and stores said new neighborhood in said neighborhood storing digital processing module, said modification checking module checks whether or not said new generated neighborhood includes the undesirable relationship accumulated in said undesirable relationship accumulating module, generates another new neighborhood when said new generated neighborhood includes said undesirable relationship and said controlling digital processing means controls said local searching module, said neighborhood storing digital processing module and said modification checking module to repeat their respective functions based on said another new neighborhood, said solution storing digital processing module stores said new generated neighborhood as a new solution when said new generated neighborhood does not include said undesirable relationship according to said modification checking module, and said controlling digital processing means determines whether or not termination conditions are satisfied, and said controlling digital processing means controls said undesirable relationship extracting module, said undesirable relationship accumulating module, said local search module, said neighborhood storing digital processing module and said modification checking module to repeat their respective functions based on said new solution when said termination conditions are determined not to be satisfied.

5. A computerized combinatorial optimization apparatus according to claim 4, further comprising:

digital processing means for setting a first operation of each job in an operation group assignable in a generation process of said initial solution in a job shop problem as said combinatorial optimization problem, and digital processing means for selecting one of an operation whose preceding operation in the same job is already assigned and the first operation in each job from the operation group, for assigning the selected operation the earliest start time in each machine, and for setting the operation next to the assigned operation in the operation group.

6. A computerized combinatorial optimization apparatus according to claim 4, further comprising:

digital processing means for setting an operation having the latest termination time among all operations as "x" in an undesirable relationship extracting process by said undesirable relation extracting module in a job shop problem as said combinatorial optimization problem, digital processing means for setting an operation followed by "x" in the same job as "y", and for setting an operation followed by "x" in the same machine as "z", digital processing means for determining whether the termination of "y" is later than that of "z", digital processing means for substituting "y" for "x" when said determining means determines the termination time of "y" is later than that of "z", and digital processing means for extracting a relationship between "z" and "x" as an undesirable relationship, and for substituting "z" for "x" when said determining means determines the termination time of "y" is not later than that of "z".

* * * * *